(12) United States Patent
Kawabata

(10) Patent No.: US 9,071,775 B2
(45) Date of Patent: Jun. 30, 2015

(54) IMAGE INFORMATION COMMUNICATION APPARATUS, IMAGE PROCESSING APPARATUS, AND STORAGE MEDIUM

(71) Applicant: Fuji Xerox Co., Ltd., Minato-ku, Tokyo (JP)

(72) Inventor: Hirotaka Kawabata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 168 days.

(21) Appl. No.: 13/866,537

(22) Filed: Apr. 19, 2013

(65) Prior Publication Data

US 2014/0092428 A1 Apr. 3, 2014

(30) Foreign Application Priority Data

Oct. 3, 2012 (JP) ................................. 2012-221589

(51) Int. Cl.
| | | |
|---|---|---|
| *G06F 3/12* | (2006.01) | |
| *H04N 1/32* | (2006.01) | |
| *H04N 1/327* | (2006.01) | |
| *H04N 1/333* | (2006.01) | |

(52) U.S. Cl.
CPC ............. *H04N 1/32* (2013.01); *H04N 1/3278* (2013.01); *H04N 1/32786* (2013.01); *H04N 1/33353* (2013.01)

(58) Field of Classification Search
None
See application file for complete search history.

(56) References Cited

U.S. PATENT DOCUMENTS

| | | | | |
|---|---|---|---|---|
| 2002/0101621 | A1* | 8/2002 | Terao ............................ | 358/405 |
| 2002/0101826 | A1* | 8/2002 | Giacopelli et al. ............ | 370/252 |
| 2003/0063324 | A1* | 4/2003 | Takaoka ........................ | 358/404 |
| 2005/0213569 | A1* | 9/2005 | Kajiwara ...................... | 370/356 |
| 2007/0201380 | A1* | 8/2007 | Ma et al. ....................... | 370/254 |
| 2008/0137441 | A1* | 6/2008 | Morikawa et al. ........ | 365/189.05 |
| 2008/0316543 | A1* | 12/2008 | Higuchi et al. ............... | 358/443 |
| 2011/0317223 | A1* | 12/2011 | Nagao et al. .................. | 358/442 |
| 2012/0254072 | A1* | 10/2012 | Ushida .......................... | 705/418 |

FOREIGN PATENT DOCUMENTS

JP 2002-077636 A 3/2002

* cited by examiner

*Primary Examiner* — Nicholas Pachol
(74) *Attorney, Agent, or Firm* — Sughrue Mion, PLLC

(57) ABSTRACT

An image information communication apparatus includes a communication unit, a permission unit, and a controller. The communication unit communicates image information with an external device in response to receiving a communication request. The permission unit permits the communication request on the basis of a result of comparison between a total band and an overall band. The total band is obtained by adding a communication band necessary for requested communication in the case where the communication unit receives the communication request and a band being used for other communications. The overall band is obtained by converting an image processing capability of the apparatus into a band. The controller controls the communication unit so as to communicate with the external device for the request permitted by the permission unit.

11 Claims, 9 Drawing Sheets

IMAGE INFORMATION COMMUNICATION APPARATUS, IMAGE PROCESSING APPARATUS, AND STORAGE MEDIUM

CROSS-REFERENCE TO RELATED APPLICATIONS

This application is based on and claims priority under 35 USC 119 from Japanese Patent Application No. 2012-221589 filed Oct. 3, 2012.

BACKGROUND

Technical Field

The present invention relates to an image information communication apparatus, an image processing apparatus, and a storage medium.

SUMMARY

According to an aspect of the present invention, there is provided an image information communication apparatus including: a communication unit that communicates image information with an external device in response to receiving a communication request; a permission unit that permits the communication request on the basis of a result of comparison between a total band and an overall band, the total band being obtained by adding a communication band necessary for requested communication in the case where the communication unit receives the communication request and a band being used for other communications, and the overall band being obtained by converting an image processing capability of the apparatus into a band; and a controller that controls the communication unit so as to communicate with the external device for the request permitted by the permission unit.

BRIEF DESCRIPTION OF THE DRAWINGS

Exemplary embodiment of the present invention will be described in detail based on the following figures, wherein.

DETAILED DESCRIPTION

Exemplary embodiments of the present invention will be described below with reference to the drawings. In the exemplary embodiments, the term "image" also refers to characters.

First Exemplary Embodiment

Figure 1:
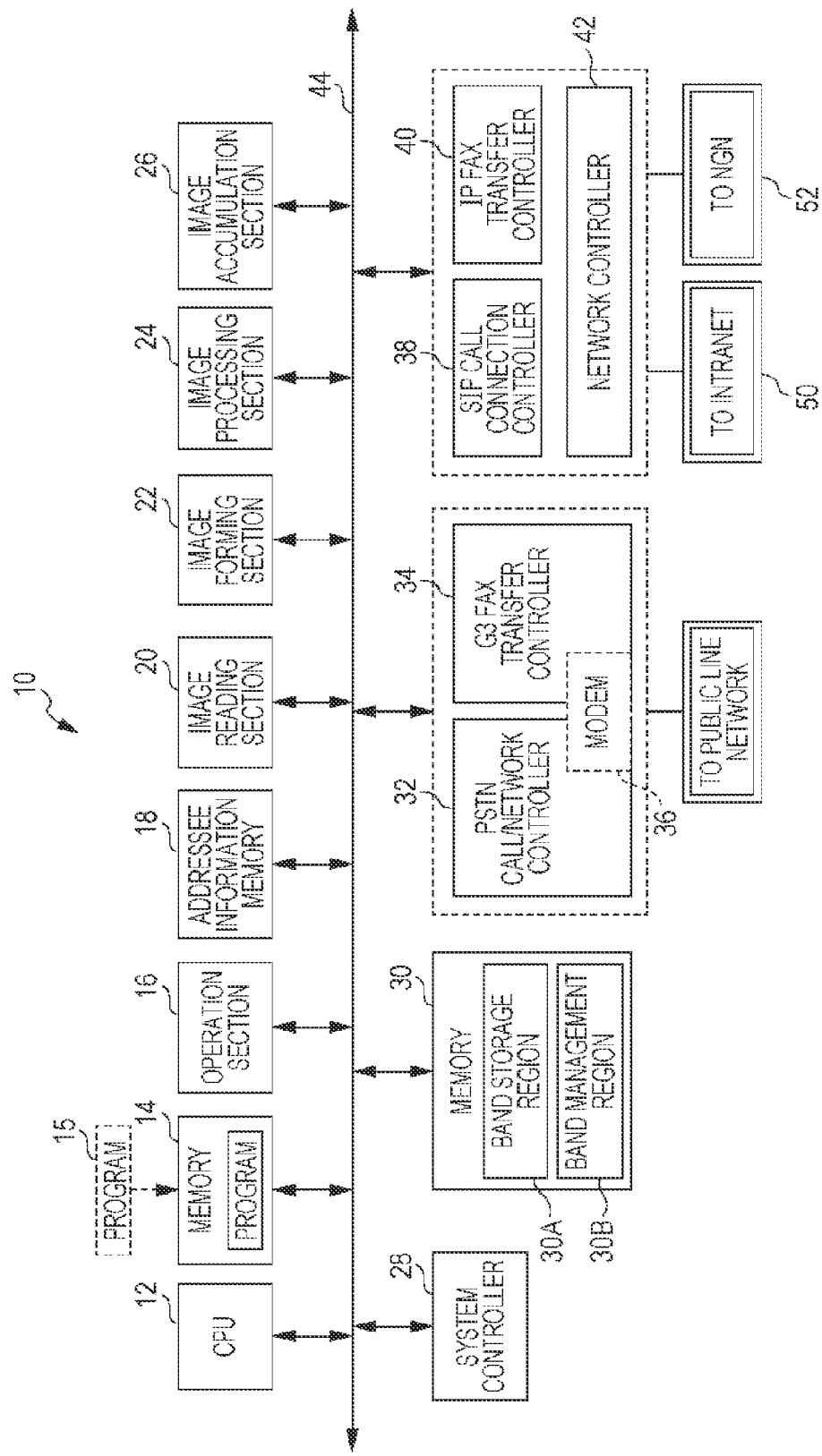
FIG. 1 is a schematic diagram showing a schematic example of the overall configuration of an image processing system according to a first exemplary embodiment.

First, the configuration of an image processing apparatus 10 according to the exemplary embodiment will be described. FIG. 1 shows a schematic diagram showing a schematic example of the overall configuration of the image processing apparatus 10 according to the exemplary embodiment. The image processing apparatus 10 according to the exemplary embodiment is configured as a so-called multi-function device having an image data communication function, an image data reading function, and an image forming function, for example. The communication function allows transmission and reception of image data to and from an external device, and corresponds to a so-called "facsimile". Hereinafter, the communication function will be referred to as "FAX". The reading function allows reading an image formed on a storage medium to generate image information, and corresponds to a so-called "scanner". The image forming function allows forming an image on a storage medium on the basis of image data, and corresponds to a so-called "printer".

As shown in FIG. 1, the image processing apparatus 10 according to the exemplary embodiment includes a CPU 12, a memory 14, an operation section 16, an addressee information memory 18, an image reading section 20, an image forming section 22, an image processing section 24, an image accumulation section 26, a system controller 28, a memory 30, a public switched telephone network (PSTN) call/network controller 32, a G3 FAX transfer controller 34, a modem 36, a session initiation protocol (SIP) call connection controller 38, an internet protocol (IP) FAX transfer controller 40, and a network controller 42. The CPU 12, the memory 14, the operation section 16, the addressee information memory 18, the image reading section 20, the image forming section 22, the image processing section 24, the image accumulation section 26, the system controller 28, the memory 30, the PSTN call/network controller 32, the G3 FAX transfer controller 34, the modem 36, the SIP call connection controller 38, the IP FAX transfer controller 40, and the network controller 42 are connected to each other for mutual data exchange through a bus 44 such as a system bus or a data bus.

The CPU 12 has a function of executing a program stored in the memory 14. The memory 14 is a non-volatile memory. The memory 14 has a function of storing various programs for use to control the image processing apparatus 10, such as a communication control program 15 to be discussed in detail later. In the exemplary embodiment, the program 15 is stored in the memory 14 in advance. However, the present invention is not limited thereto, and the program 15 may be installed in the memory 14 from an external device (not shown). The program 15 may also be installed in the memory 14 via a network. The program 15 may further be installed in the memory 14 from an external storage medium such as a DVD-ROM, a flash memory, and a USB memory.

The operation section 16 has a user interface function of allowing operation by a user when issuing a command for transmitting image data or a command for image processing. Specific examples of the operation section 16 include a touch panel and a keyboard including a numeric keypad. The addressee information memory 18 has a function of storing information related to the addressee to which a FAX is to be transmitted. For example, the addressee information memory 18 has a function of storing addressee information such as abbreviated dial numbers and capacity information for each addressee.

The image reading section 20 has a function of reading the image discussed above to generate image information. The image forming section 22 has a function of forming the image discussed above. The image processing section 24 has a function of performing predetermined image processing on image data. The image accumulation section 26 has a function of accumulating image data or the like read by the image reading section 20. The image accumulation section 26 may be volatile or non-volatile.

The system controller 28 has a function of controlling the entire image processing apparatus 10.

The memory 30 includes a band storage region 30A and a band management region 30B, and may be a RAM, an NVRAM, or the like, for example. The band storage region 30A stores an overall use band. The overall use band has a value obtained by converting the capacity of the image processing function of the image processing apparatus 10 into a band, and corresponds to a band that may be processed at the same time. The band management region 30B corresponds to a region that stores the band being used for communication in order to manage the band being currently used for communication. The band management region 30B may store the values of bands being used for respective communications, or may store the sum of the values of bands being used for respective communications.

The PSTN call/network controller 32 has a function of establishing a call over an analog public line network and controlling a network connection. The G3 FAX transfer controller 34 has a function of controlling a FAX protocol in accordance with T.30 procedures which are standards that determine a communication scheme (specifically, an ITU-T recommendation). The modem 36 has a function of transmitting and receiving a signal. The image processing apparatus 10 communicates with an external device (external device 8) via an analog public line network through the PSTN call/network controller 32, the G3 FAX transfer controller 34, and the modem 36. The image processing apparatus 10 does not necessarily include the PSTN call/network controller 32, the G3 FAX transfer controller 34, and the modem 36 in the case where communication is not performed via an analog public line network.

The SIP call connection controller 38 has a function of controlling a call connection in accordance with SIP procedures. In the exemplary embodiment, in addition, the SIP call connection controller 38 has a function of executing a communication control process to be discussed in detail later to determine the total bandwidth used by IP FAX in communication and whether or not additional transmission and reception may be performed. The IP FAX transfer controller 40 has a function of controlling an IP FAX protocol in accordance with T.38 procedures which are standards that determine a communication scheme (specifically, an ITU-T recommendation). The network controller 42 has a function of controlling a network connection. The image processing apparatus 10 according to the exemplary embodiment communicates with an external device (external device 8) via an intranet 50 and a next generation network (NGN) 52 through the SIP call connection controller 38, the IP FAX transfer controller 40, and the network controller 42.

Figure 2:
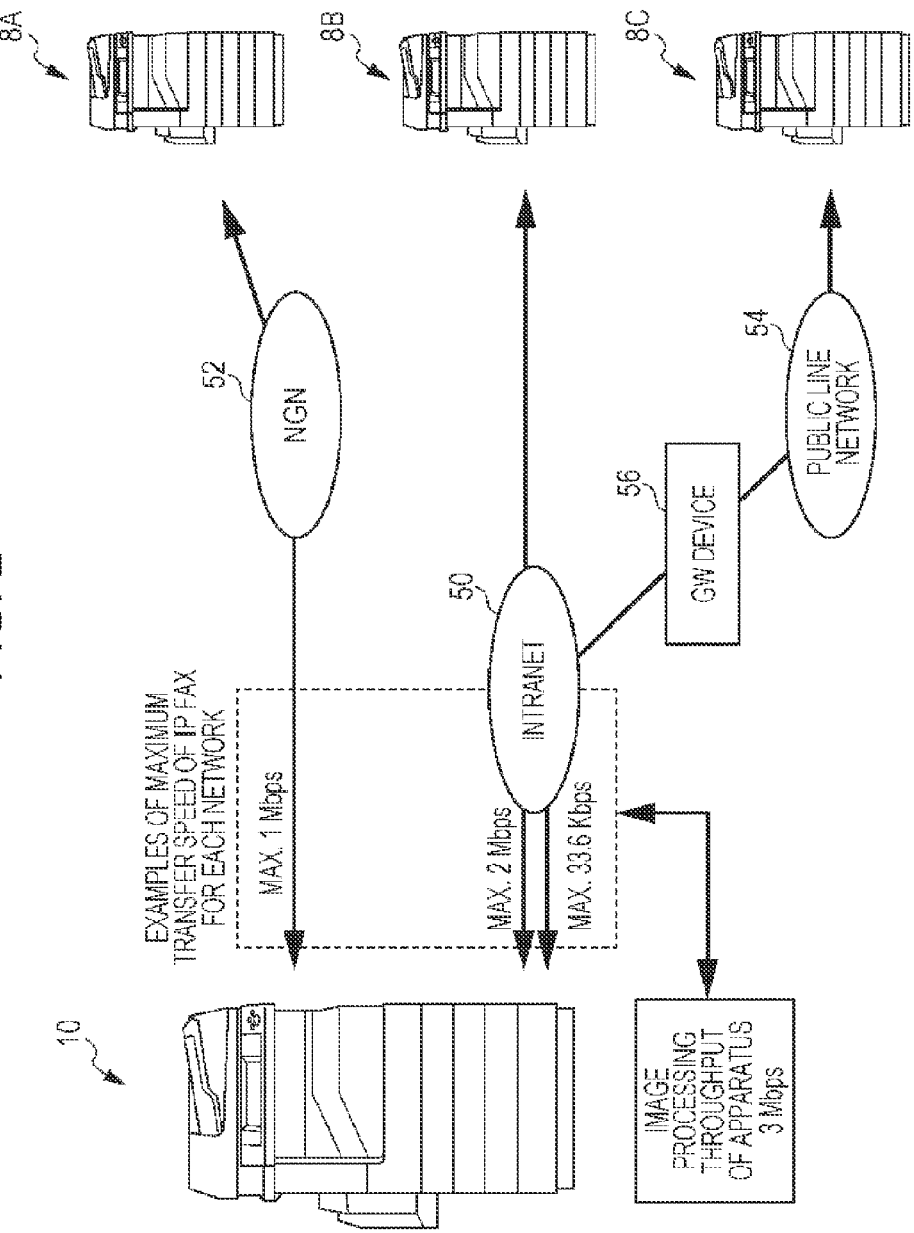
FIG. 2 is a schematic diagram showing a schematic example of the device configuration according to the first exemplary embodiment.

FIG. 2 shows a schematic diagram showing an example of the device configuration of the exemplary embodiment. Hereinafter, as a specific example, the band obtained by converting the image processing capability (image processing throughput) of the image processing apparatus 10 will be illustrated as 3 Mbps.

The image processing apparatus 10 according to the exemplary embodiment does not restrict the number of channels (sessions) in concurrent communication or limit the number of connections for each network, but permits call connections with external devices 8 (8A, 8B, and 8C) until the overall use band is reached. Hereinafter, the external devices 8A, 8B, and 8C are referred to as "external devices 8" when they are collectively referred to, and referred to with the symbols A to C added when they are individually referred to.

The image processing apparatus 10 and the external device 8A are connected to each other through the NGN 52. In the exemplary embodiment, examples of the transfer speed for communication through the NGN 52 include 1 Mbps, 0.5 Mbps, and 64 Kbps, and a billing table is provided for each use band, for example. In the exemplary embodiment, as in the specific example shown in FIG. 2, the maximum transfer speed is defined as 1 Mbps. Hereinafter, communication through the NGN 52 such as that between the image processing apparatus 10 and the external device 8A is referred to as "NGN communication".

Meanwhile, the image processing apparatus 10 and the external devices 8B and 8C are connected to each other through the intranet 50. Hereinafter, connection through the intranet 50 is occasionally referred to as "IP recognition mode". Communication in the IP recognition mode is not limited to the transfer speed according to the T.30 protocol. Therefore, communication in the IP recognition mode is performed at the maximum speed of the network or the maximum throughput that may be handled by the image processing apparatus 10 and the external devices 8B and 8C. In the exemplary embodiment, as in the specific example shown in FIG. 2, the maximum transfer speed for communication between the image processing apparatus 10 and the external devices 8B and 8C is defined as 2 Mbps.

The external device 8C is a G3 facsimile. The image processing apparatus 10 and the external device 8C are connected to each other by a public line network 54 by way of a gateway (GW) device 56 (in the exemplary embodiment, a VoIP GW is used) in addition to the intranet 50. The communication transfer speed is set in the range of 2400 bps to 33.6 Kbps for Super G3, and in the range of 2400 bps to 14.4 Kbps for G3, so as to match the external device 8C. In the system according to the exemplary embodiment, as in the specific example shown in FIG. 2, the maximum transfer speed for communication between the image processing apparatus 10 and the external devices 8C is defined as 33.6 Kbps.

Hereinafter, communication between the image processing apparatus 10 and the external device 8B is referred to as "communication over the intranet", and communication between the image processing apparatus 10 and the external device 8C is referred to as "communication by way of the GW".

Figure 3:
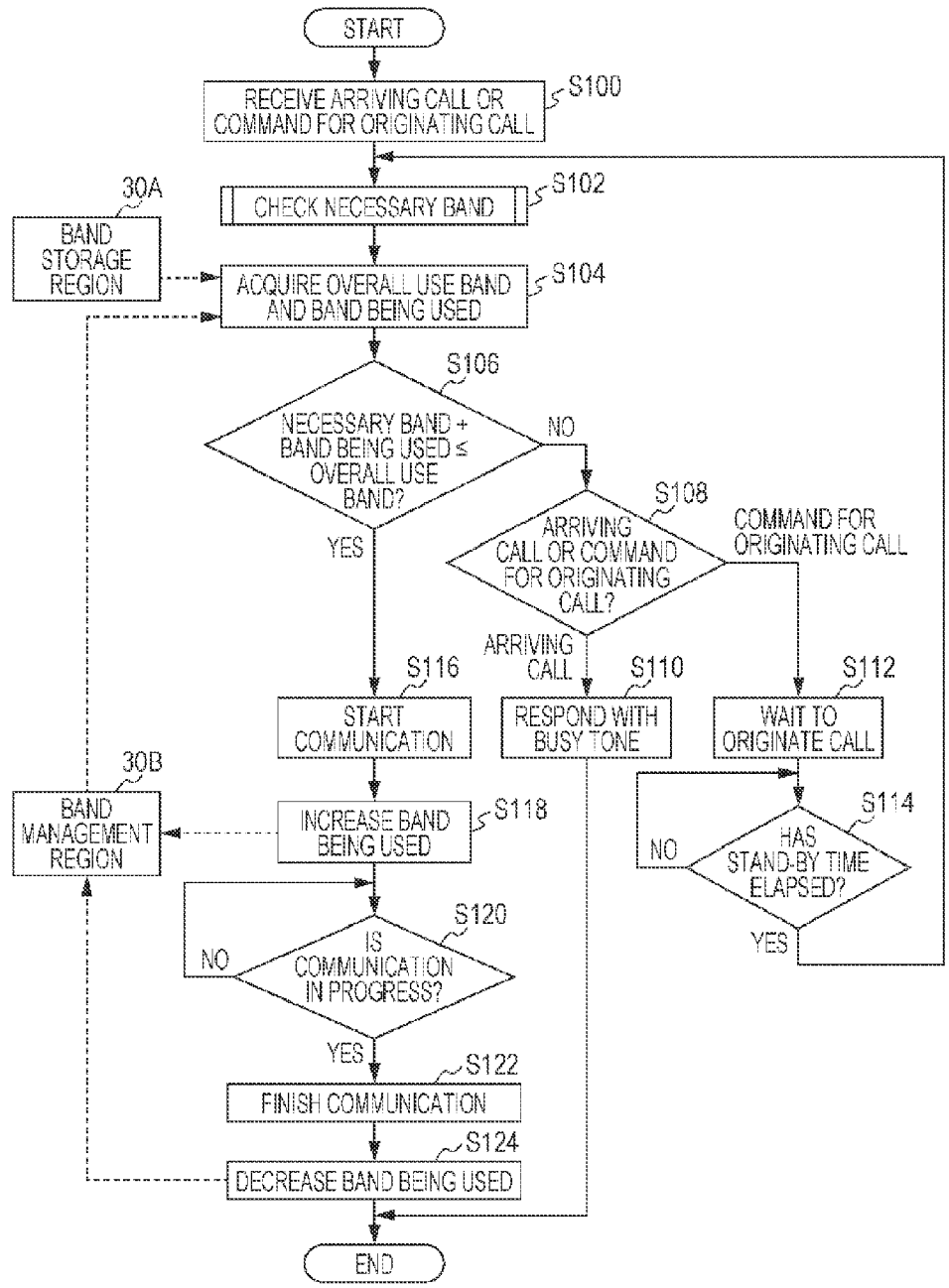
FIG. 3 is a flowchart of an example of a communication control process according to the first exemplary embodiment.

Next, the communication control process of the image processing apparatus 10 according to the exemplary embodiment will be described. FIG. 3 is a flowchart of an example of the flow of the communication control process executed by the image processing apparatus 10 according to the exemplary embodiment.

In step S100, a call arriving from the external device 8 or a command for originating a call to the external device 8 is received. Hereinafter, the flow of the communication control process for a case where a call arriving from the external device 8 is received is described first, and the flow of the communication control process for a case where a command for originating a call to the external device 8 is received is described next.

In the case where a call arriving from the external device 8 is received, in step S102, a band necessary for communication (IP FAX communication) matching the arriving call is checked and acquired.

In case of NGN communication, a requested band (64 Kbps/512 Kbps/1 Mbps) in a session description protocol (SDP) of SIP Invite is adopted as the necessary band.

In the case where it is revealed from information on the address of the origin of the arriving call (sender) that communication is to be made by way of the GW, it is checked with reference to the version of T.38 whether communication is limited to V.17 or lower or also includes V.34 to adopt either of 14.4 Kbps and 33.6 Kbps as the necessary band.

In case of communication over the intranet or the like, and in the case where no restriction on the band is provided, in particular, a necessary band set in advance (in the exemplary embodiment, 2 Mbps) is adopted.

In the case where the transfer speed or the like is restricted for each user datagram protocol (UDP) communication, the transfer speed is acquired as the necessary band.

In the next step S104, the overall use band and the band being used are acquired. Specifically, the overall use band is acquired from the band storage region 30A. Meanwhile, the band being currently used for communication is acquired from the band management region 30B.

In the next step S106, it is determined whether or not the sum of the necessary band and the band being used is equal to or less than the overall use band. If the sum is not equal to or less than the overall use band, the process proceeds to step S108. In step S108, it is determined whether an arriving call has been received or a command for originating a call has been received. Because an arriving call has been received here, the process proceeds to step S110. In step S110, the image processing apparatus 10 responds to the external device 8 with a busy tone that indicates that the line is busy. After that, the process is finished.

If the sum is equal to or less than the overall use band in step S106, on the other hand, the process proceeds to step S116. In step S116, the image processing apparatus 10 permits the arriving call, responds to the external device 8 with "200-OK", and starts communication with the external device 8. When communication is started, in the next step S118, the band used for the communication is added to the band being used of the band management region 30B.

Further, if the communication with the external device 8 is in progress, the determination result in the next step S120 is negative, and the image processing apparatus 10 stands by during the communication. If the communication is to be finished, the process proceeds to step S122, where the communication is finished. When the communication is finished, in the next step S124, the band used in the communication is subtracted from the band being used of the band management region 30B. After that, the process is finished.

On the other hand, in the case where a command for originating a call to the external device 8 is provided, in step S102, a band necessary for communication (IP FAX communication) matching the call to be originated is checked and acquired.

In case of NGN communication, the transfer speed (64 Kbps/512 Kbps/1 Mbps) selected for communication is adopted as the necessary band.

In the case where a command for communication by way of the GW is provided, it is checked in accordance with the settings of the apparatus 10 and the command information whether communication is limited to V.17 or lower or also includes V.34 to adopt either of 14.4 Kbps and 33.6 Kbps as the necessary band.

In case of communication over the intranet or the like, and in the case where no restriction on the band is provided, in particular, a necessary band set in advance (in the exemplary embodiment, 2 Mbps) is adopted.

In the case where the transfer speed or the like is restricted for each user datagram protocol (UDP) communication, the transfer speed is acquired as the necessary band.

In the next step S104, as in the case where an arriving call is received as discussed above, the overall use band is acquired from the band storage region 30A, and the band being used is acquired from the band management region 30B.

In the next step S106, it is determined whether or not the sum of the necessary band and the band being used is equal to or less than the overall use band. If the sum is not equal to or less than the overall use band, the process proceeds to step S108. In step S108, it is determined whether an arriving call has been received or a command for originating a call has been received. Because a command for originating a call has been received here, the process proceeds to step S112. In step S112, the image processing apparatus 10 waits to originate (transmit) a call. The determination result in the next step S114 is negative and the stand-by state is continued until a stand-by time such as a redial time elapses. The determination result becomes positive when the stand-by time elapses, and the process returns to step S102 to repeat the process. In the case where the image processing apparatus 10 waits (stands by) to originate a call a predetermined number of times, in the case where a predetermined time elapses after the image processing apparatus 10 first waits (stands by) to originate a call, and so forth, the process may be finished without repeating the process. In this case, the user may be informed that no call has been originated (transmitted).

If the sum is equal to or less than the overall use band in step S106, on the other hand, the process proceeds to step S116. In step S116, the image processing apparatus 10 transmits Invite to the external device 8 to start a call. When the external device 8 responds with "200-OK" in response to the Invite, in the next step S116, the image processing apparatus 10 starts communication with the external device 8. When communication is started, in the next step S118, the band used for the communication is added to the band being used of the band management region 30B.

Further, if the communication with the external device 8 is in progress, the determination result in the next step S120 is negative, and the image processing apparatus 10 stands by during the communication. If the communication is to be finished, the process proceeds to step S122, where the communication is finished. When the communication is finished, in the next step S124, the band used in the communication is subtracted from the band being used of the band management region 30B. After that, the process is finished.

In the exemplary embodiment, as described above, a value obtained by converting the image processing capability of the image processing apparatus 10 into a band is stored in the band storage region 30A as the overall use band, and the band being used for communication is stored in the band management region 30B as the band being used. In the case where a communication request (call connection request) is received, the image processing apparatus 10 checks the band necessary for the communication. If the sum of the necessary band and the band being used is equal to or less than the overall use band, communication is permitted. If not, communication is rejected.

In the IP FAX according to the related art, the number of sessions is determined in such a range that meets the design value of the throughput in the IP recognition mode which requires the maximum speed. For example, in the case where the image processing capability of the apparatus 10 is 4 Mbps when converted to a band and the design value of the throughput in the IP recognition mode is 2 Mbps, the number of concurrent sessions (channels) is two. In such a configuration, a communication request may be rejected and responded to with a busy tone when communication is performed in two channels, even if the communication in both the two channels is performed at a low speed (for example, 14.4 Kbps) by way of VoIP GW and there is an extra band, because the number of concurrent sessions has been reached. This tends to increase the communication time because of the low-speed communication, and to increase the engagement rate.

In the exemplary embodiment, in contrast, whether or not communication is allowed is controlled in accordance with a value obtained by converting the image processing capability of the apparatus 10 into a band, irrespective of the number of sessions, which reduces the engagement rate.

Second Exemplary Embodiment

A second exemplary embodiment includes a configuration and an operation generally similar to those of the first exemplary embodiment discussed above. Therefore, such similarities will not be described in detail herein.

The overall configuration (see FIG. 1) and the device configuration (see FIG. 2) of the image processing apparatus 10 according to the second exemplary embodiment are generally similar to those of the first exemplary embodiment, and therefore will not be described.

Figure 4:
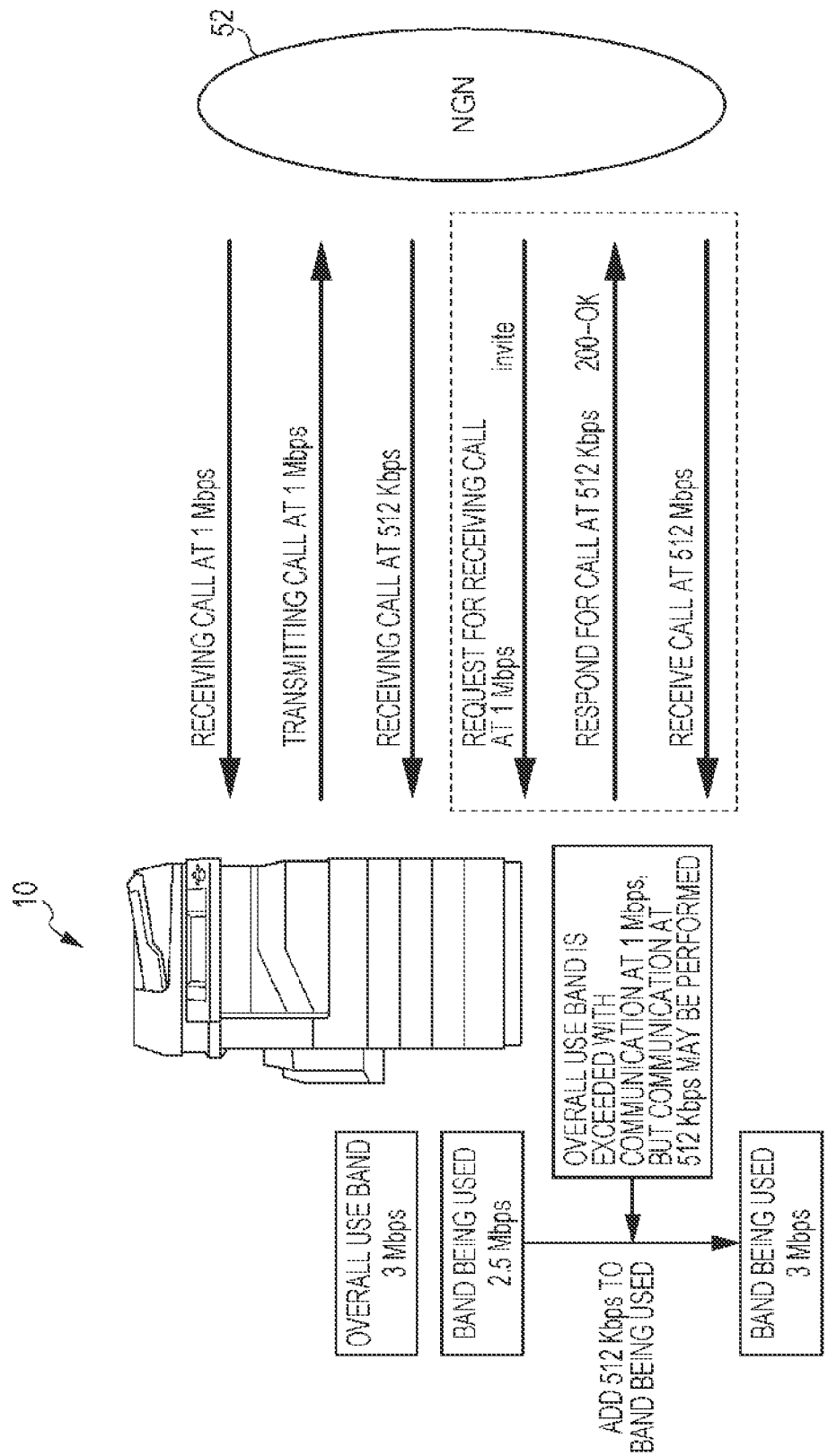
FIG. 4 illustrates an example of the flow of a communication control process according to a second exemplary embodiment.

A communication control process of the image processing apparatus 10 according to the second exemplary embodiment will be described. FIG. 4 illustrates an example of the flow of a communication control process according to the second exemplary embodiment.

In the second exemplary embodiment, as shown, for example, in FIG. 4, a call arrives from the external device 8 while three communications are performed with the external device 8 through NGN communication. Specifically, as shown in FIG. 4, the image processing apparatus 10 is receiving a call from the external device 8 at 1 Mbps, transmitting a call to the external device 8 at 1 Mbps, and receiving a call from the external device 8 at 512 Kbps. The overall use band is 3 Mbps, and the band storage region 30A stores 3 Mbps. In this state, the band being used is 1+1+0.512≈2.5 Mbps, and the band management region 30B stores 2.5 Mbps.

In this state, a case where an arriving call (a request for receiving a call, invite) at a transfer speed of 1 Mbps from the external device 8 is received as shown in FIG. 4 is considered.

The necessary band is 1 Mbps, and the sum of the necessary band (1 Mbps) and the band being used (2.5 Mbps) is equal to 3.5 Mbps, which is more than the overall use band (3 Mbps). In the case where communication were performed at the transfer speed requested by the external device 8, the overall use band would be exceeded.

On the other hand, the image processing apparatus 10 determines that communication may be performed if the necessary band is equal to or less than the overall use band minus the band being used. Here, the image processing apparatus 10 determines that communication may be performed at a transfer speed of 512 Kbps or 64 Kbps, and selects the higher one (512 Kbps) of these speeds. The image processing apparatus 10 responds to the external device 8 with "200-OK" with SDP set to the selected transfer speed (512 Kbps).

To be exact, if the necessary band is 512 Mbps, the sum of 512 Mbps and 2.5 Mbps is equal to 3.012 Mbps, which exceeds the overall use band (3 Mbps). In the case where the band being used exceeds the overall use band, the transfer speed is reduced. However, a range in which the transfer speed is considered to be hardly reduced may be defined as an allowable range (allowable bandwidth). In the second exemplary embodiment, such an allowable range is set in advance.

When "200-OK" is received, the external device 8 starts communication at a transfer speed of 512 Kbps.

When communication with the external device 8 is started, the image processing apparatus 10 converts the transfer speed of 512 Kbps which is used for actual communication, rather than 1 Mbps which is requested by invite from the external device 8, into a band to be added to the band being used of the band management region 30B.

In the second exemplary embodiment, as described above, the image processing apparatus 10 responds to the external device 8 with a communicable band set even in the case where communication may not be performed at the band requested by the external device 8.

Third Exemplary Embodiment

A third exemplary embodiment includes a configuration and an operation generally similar to those of the first exemplary embodiment discussed above. Therefore, such similarities will not be described in detail herein.

Figure 5:
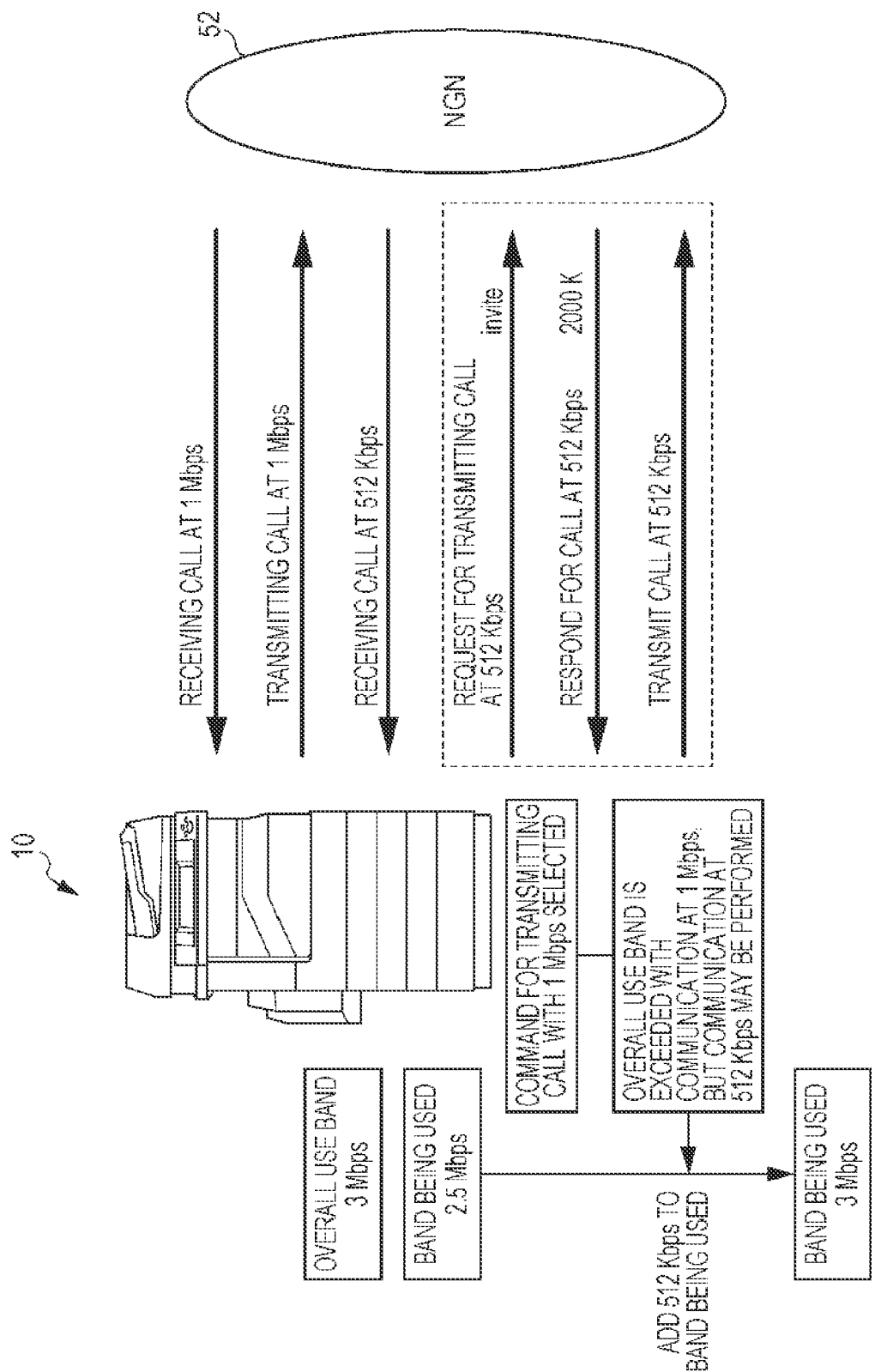
FIG. 5 illustrates an example of the flow of a communication control process according to a third exemplary embodiment.

A communication control process of the image processing apparatus 10 according to the third exemplary embodiment will be described. FIG. 5 illustrates an example of the flow of a communication control process according to the third exemplary embodiment.

In the third exemplary embodiment, as in the second exemplary embodiment (FIG. 4), three communications are performed with the external device 8 through NGN communication. In the third exemplary embodiment, further, a command for originating a call to the external device 8 is provided during such communications.

In this state, a case where a command for transmitting (originating) a call to the external device 8 with a transfer speed of 1 Mbps selected is received from the user or the like as shown in FIG. 5 is considered.

The necessary band is 1 Mbps, and the sum of the necessary band (1 Mbps) and the band being used (2.5 Mbps) is equal to 3.5 Mbps, which is more than the overall use band (3 Mbps). In the case where communication were performed at the transfer speed requested by the external device 8, the overall use band would be exceeded.

On the other hand, the image processing apparatus 10 determines that communication may be performed if the necessary band is equal to or less than the overall use band minus the band being used. Here, the image processing apparatus 10 determines that communication may be performed at a transfer speed of 512 Kbps or 64 Kbps, and selects the higher one (512 Kbps) of these speeds. The image processing apparatus 10 negotiates with the external device 8 for communication at the selected transfer speed (512 Kbps). Specifically, the image processing apparatus 10 originates a call to the external device 8 with SDP of invite set to a band of 512 Kbps. The external device 8 receives the call originated from the image processing apparatus 10, and responds to the image processing apparatus 10 with "200-OK". This makes it possible to start communication at a transfer speed of 512 Kbps.

When communication with the external device 8 is started, the image processing apparatus 10 converts the transfer speed of 512 Kbps which is used for actual communication, rather than 1 Mbps which is requested by the command for originating a call, into a band to be added to the band being used of the band management region 30B.

In the third exemplary embodiment, as described above, the image processing apparatus 10 negotiates with the external device 8 for communication at a communicable band even in the case where communication may not be performed at the band determined by the command for originating a call to the external device 8.

Fourth Exemplary Embodiment

A fourth exemplary embodiment includes a configuration and an operation generally similar to those of the exemplary embodiments discussed above. Therefore, such similarities will not be described in detail herein.

The overall configuration (see FIG. 1) and the device configuration (see FIG. 2) of the image processing apparatus 10 according to the fourth exemplary embodiment are generally similar to those of the first exemplary embodiment, and therefore will not be described.

Figure 6:
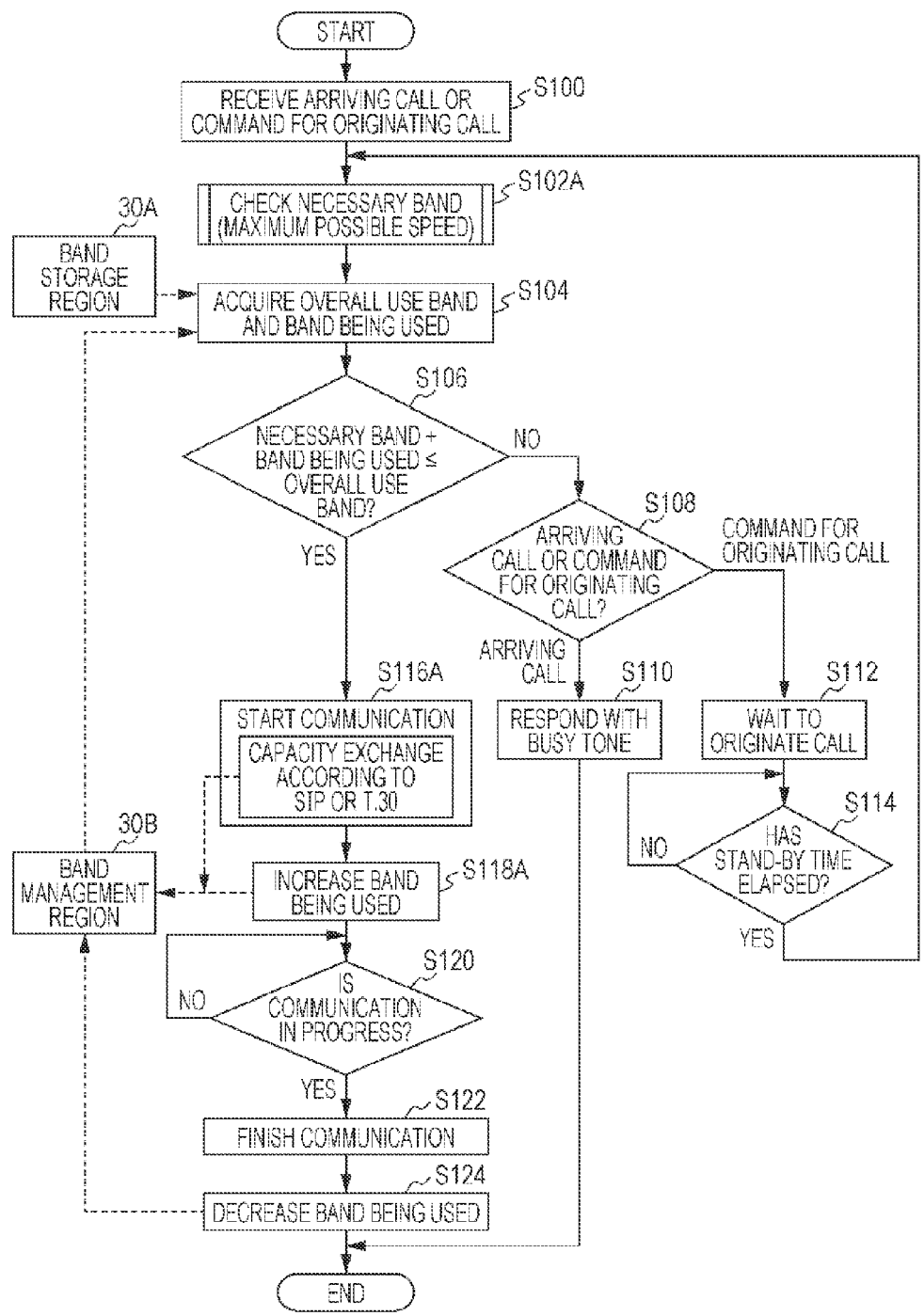
FIG. 6 is a flowchart of an example of a communication control process according to a fourth exemplary embodiment.

A communication control process of the image processing apparatus 10 according to the fourth exemplary embodiment will be described. FIG. 6 is a flowchart of an example of the communication control process according to the fourth exemplary embodiment. Processes (steps) generally similar to those of the communication control process according to the first exemplary embodiment (see FIG. 3) are denoted by the same reference symbols.

In the communication control process according to the fourth exemplary embodiment, step S102A is provided in place of step S102 of the communication control process according to the first exemplary embodiment discussed above. In step S102A of the communication control process according to the fourth exemplary embodiment, the maximum speed (maximum band) possibly used by the apparatus 10 for communication is acquired in checking the necessary band.

For example, in the case where the image processing apparatus 10 provides an offer to the external device 8 at 1 Mbps when originating a call to the external device 8 during NGN communication, 1 Mbps is acquired. In another example, in the case where the apparatus 10 is capable of communication according to Super G3 (V.34) during communication by way of the GW or the like, 33.6 Kbps is acquired.

The processes in steps S104 to S114 which follow step S102A are generally the same as those according to the first exemplary embodiment. In the communication control process according to the fourth exemplary embodiment, in the case where it is determined in step S106 that the sum of the necessary band and the band being used is equal to or less than the overall use band, steps S116A and S118A are performed in place of steps S116 and S118 according to the first exemplary embodiment.

In step S116A, communication is started, and the actual transfer speed is determined by negotiation (capacity exchange) according to the SIP or T.30 protocol, rather than the necessary band acquired in step S102A described above. Therefore, in the next step S118A, for sessions for which the transfer speed is determined by negotiation according to the SIP or T.30 protocol, the transfer speed determined by negotiation is added to the band being used of the band management region 30B. For sessions before determination by negotiation according to the SIP or T.30 protocol, on the other hand, the maximum transfer speed for the selected mode (path) is adopted, and added to the band being used of the band management region 30B.

In a specific example, the apparatus 10 may attempt to perform communication according to V.34, but the external device 8 connected by way of the GW may have only a capacity of 9600 bps according to V.29, and communication may be started at 9600 bps. In this case, 9600 bps is added to the band management region 30B, and 9600 bps is subtracted from the band management region 30B after the communication is finished.

Similarly, in case of NGN communication, the image processing apparatus 10 may provide an offer at 1 Mbps, but 64 Kbps may be set in "200-OK" returned from the external device 8. In this case, 64 Kbps is added to the band management region 30B, and 64 Kbps is subtracted from the band management region 30B after the communication is finished.

In the fourth exemplary embodiment, as described above, the maximum speed (maximum band) possibly used by the apparatus 10 for communication is acquired in checking the necessary band, and the band actually used for communication is added to the band being used after communication is started.

Fifth Exemplary Embodiment

A fifth exemplary embodiment includes a configuration and an operation generally similar to those of the exemplary embodiments discussed above. Therefore, such similarities will not be described in detail herein.

Figure 7:
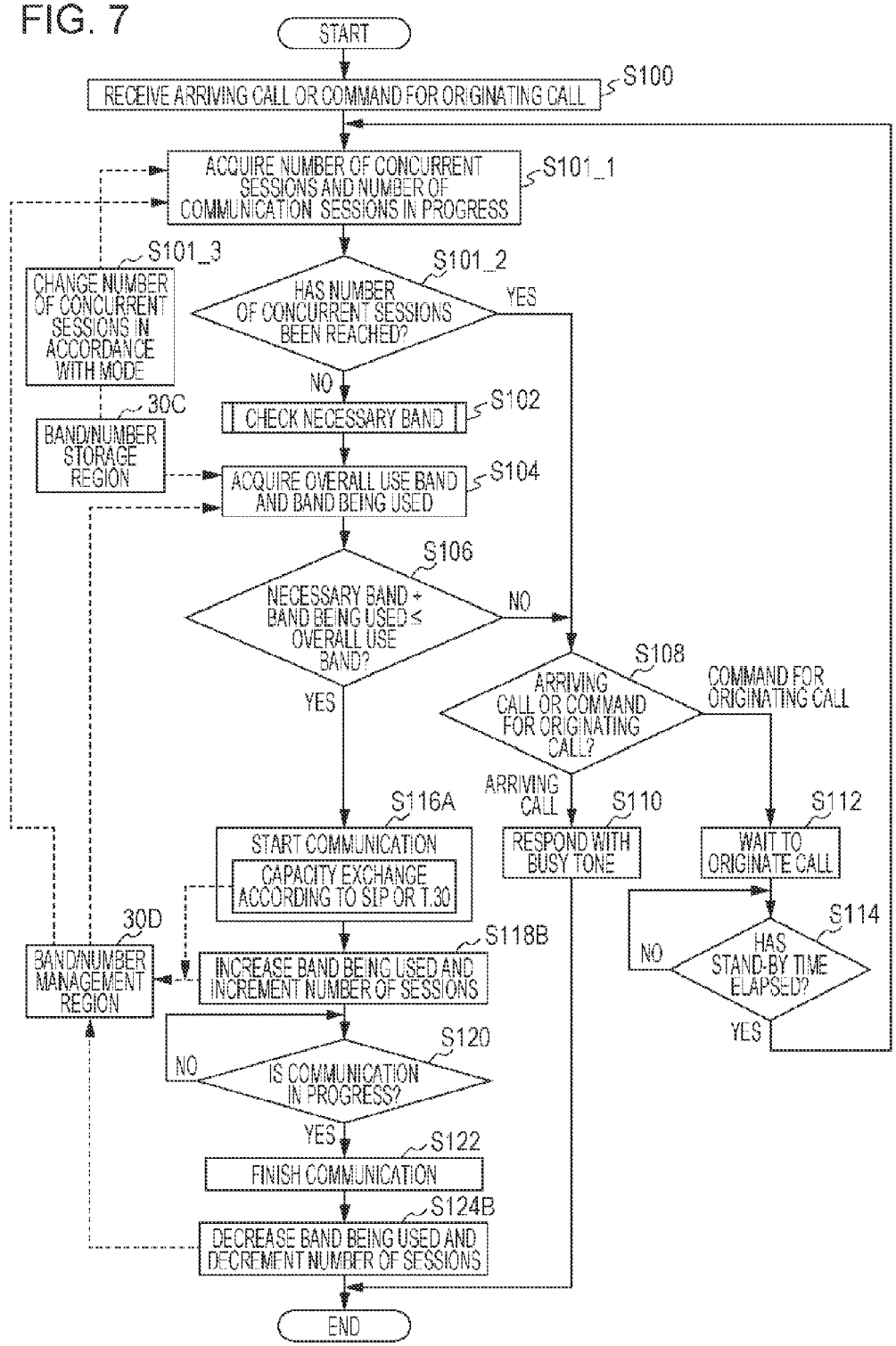
FIG. 7 is a flowchart of an example of a communication control process according to a fifth exemplary embodiment.

The image processing apparatus 10 according to the fifth exemplary embodiment controls communication (controls whether or not communication is allowed) on the basis of not only the overall use band but also the number of sessions in which communication may be performed concurrently. Therefore, as shown in FIG. 7, the image processing apparatus 10 according to the fifth exemplary embodiment includes a band/number storage region 30C and a band/number management region 30D in place of the band storage region 30A and the band management region 30B, respectively, of the image processing apparatus 10 according to the first exemplary embodiment.

The band/number storage region 30C stores in advance the overall use band and the number of sessions in which communication may be performed concurrently. The band/number management region 30D stores the band being used and the number of communication sessions in progress. In the fifth exemplary embodiment, the band/number storage region 30C and the band/number management region 30D are provided in place of the band storage region 30A and the band management region 30B, respectively. However, the present invention is not limited thereto, and a storage region that stores the number of concurrent sessions and a management region that manages the number of communication sessions in progress may be provided in addition to the band storage region 30A and the band management region 30B.

The device configuration (see FIG. 2) of the image processing apparatus 10 according to the fifth exemplary embodiment are generally similar to that of the first exemplary embodiment, and therefore will not be described.

A communication control process of the image processing apparatus 10 according to the fifth exemplary embodiment will be described. FIG. 7 is a flowchart of an example of the communication control process according to the fifth exemplary embodiment. Processes (steps) generally similar to those of the communication control processes according to the exemplary embodiments discussed above (see FIGS. 3 and 6) are denoted by the same reference symbols.

In the communication control process according to the fifth exemplary embodiment, steps S101_1 and S101_2 are provided between steps S100 and S102 of the communication control processes according to the exemplary embodiments discussed above.

In step S101_1, the number of concurrent sessions is acquired from the band/number storage region 30C. In addition, the number of communication sessions in progress is acquired from the band/number management region 30D.

In the next step S101_2, it is determined whether or not the number of communication sessions in progress has reached the number of concurrent sessions. If the number of concurrent sessions has been reached, the process proceeds to step S108, and the same processes as those in steps S108 to S114 of the communication control processes according to the exemplary embodiments discussed above are performed. If the number of concurrent sessions has not been reached, on the other hand, the process proceeds to step S102, and the same processes as those in steps S102 to S106 and S116A of the communication control processes according to the exemplary embodiments discussed above are performed. In the communication control process according to the fifth exemplary embodiment, step S118B is provided after step S116A in place of step S118 or S118A. Further, step S124B is provided in place of step S124.

In the fifth exemplary embodiment, in step S118B after communication is started, the band to be used for communication is added to the band being used of the band/number management region 30D, and the number of communication sessions in progress is incremented (increased by 1).

Further, in the fifth exemplary embodiment, in step S124B after the communication is finished, the band used for communication is subtracted from the band being used of the band/number management region 30D, and the number of communication sessions in progress is decremented (decreased by 1).

In the case where whether or not communication is allowed is controlled in accordance with the number of sessions as described above, the number of concurrent sessions may be changed in accordance with the communication mode used (mode matching the network/communication) as in step S101_3 shown in FIG. 7. Specifically, the number of concurrent sessions may be changed between the IP recognition mode (communication through the intranet) and the NGN mode (NGN communication). For example, the number of concurrent sessions is set to two for the IP recognition mode, and may be set to six for the NGN mode. The number of sessions for each mode may be set in advance in the image processing apparatus 10, or may be set by an administrator, the user, or the like by operating the operation section 16. Whether or not to change the number of sessions as described above may also be set in advance in the image processing apparatus 10, or may be set by the administrator, the user, or the like by operating the operation section 16.

In the fifth exemplary embodiment, as described above, the number of communication sessions currently in progress (number of communication sessions in progress) is referenced prior to checking the necessary band. In the case where the number of concurrent sessions has been reached, the image processing apparatus 10 responds with a busy tone or waits to originate a call without checking the necessary band.

Sixth Exemplary Embodiment

A sixth exemplary embodiment includes a configuration and an operation generally similar to those of the fifth exemplary embodiment discussed above. Therefore, such similarities will not be described in detail herein. The overall configuration (see FIG. 1) and the device configuration (see FIG. 2) of the image processing apparatus 10 according to the sixth exemplary embodiment are generally similar, and therefore will not be described.

Figure 8:
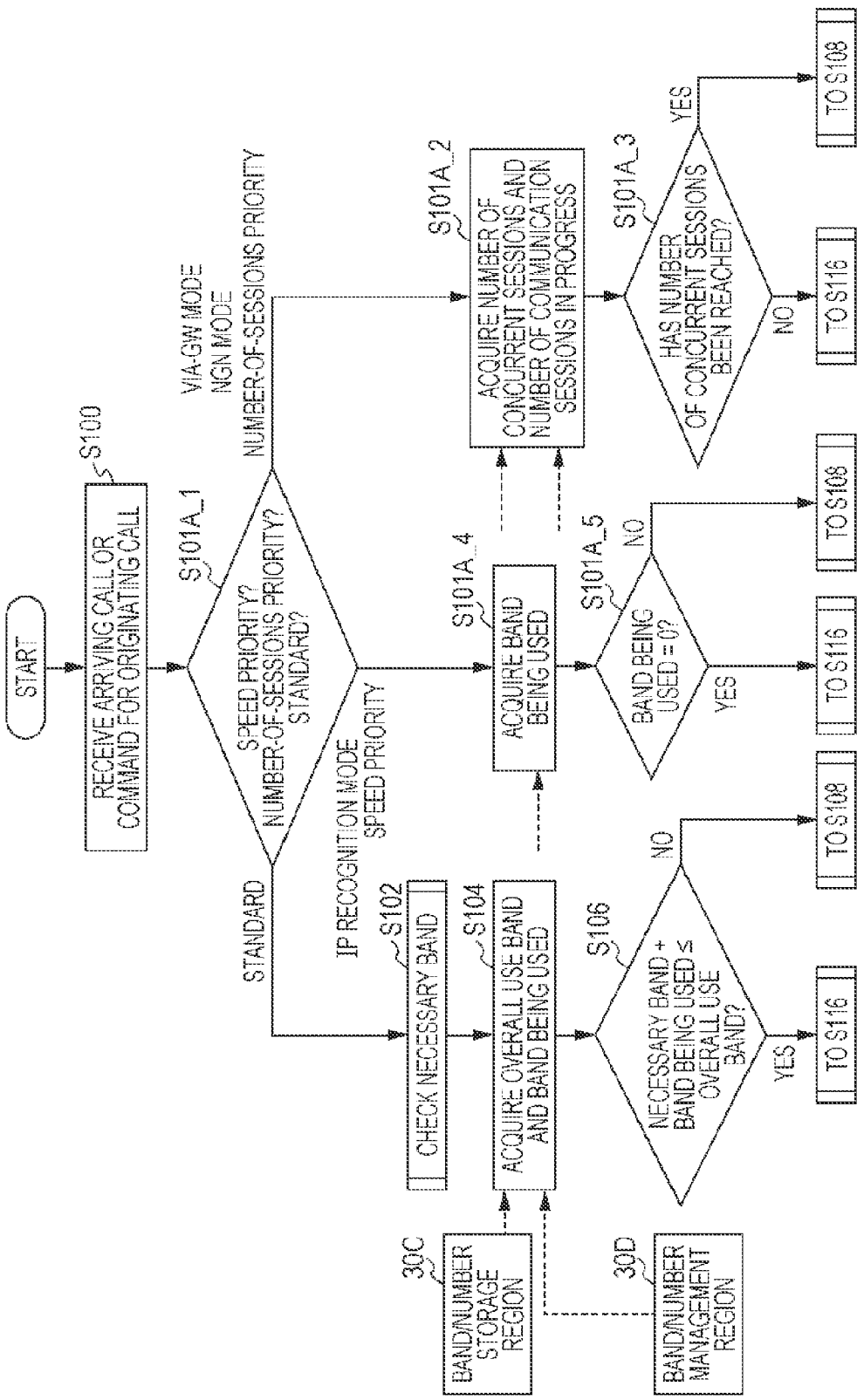
FIG. 8 is a flowchart of an example of a communication control process according to a sixth exemplary embodiment.

A communication control process of the image processing apparatus 10 according to the sixth exemplary embodiment will be described. FIG. 8 is a flowchart of an example of the communication control process according to the sixth exemplary embodiment. Processes (steps) generally similar to those of the communication control process according to the fifth exemplary embodiment (see FIG. 7) are denoted by the same reference symbols.

In the sixth exemplary embodiment, switching may be made among the speed priority mode for the IP recognition mode, the number-of-sessions priority mode for the NGN mode and the via-GW mode, and the standard mode (a mode other than the speed priority mode and the number-of-sessions priority mode, corresponding to the fifth exemplary embodiment). For example, the standard mode may be set as the default mode, and switching may be made to either of the speed priority mode and the number-of-sessions priority mode by the administrator, the user, or the like by operating the operation section 16.

In the communication control process according to the sixth exemplary embodiment, step S101A_1 is provided between steps S100 and S102 in place of steps S101_1 to S101_3 of the communication control process according to the fifth exemplary embodiment discussed above, and steps S101A_2 to S101A_5 are provided.

In step S101A_1, it is determined which of the speed priority mode for the IP recognition mode, the number-of-sessions priority mode for the NGN mode and the via-GW mode, and the standard mode (corresponding to the fifth exemplary embodiment) is set.

In case of the standard mode, the processes in and after step S102 of the communication control processes according to the exemplary embodiments discussed above are executed.

In case of the number-of-sessions priority mode, the process proceeds to step S101A_2. In the sixth exemplary embodiment, in case of the number-of-sessions priority mode for the NGN mode and the via-GW mode, a request for a call connection by way of NGN or GW is not permitted in the case where the number of concurrent sessions is reached even if the band being used has not reached the overall use band, for example. Therefore, in step S101A_2, the number of concurrent sessions is acquired from the band/number storage region 30C, and the number of communication sessions in progress is acquired from the band/number management region 30D. Then, in the next step S101A_3, it is determined whether or not the number of communication sessions in progress has reached the number of concurrent sessions. If the number of concurrent sessions has been reached, a call connection is not permitted. Therefore, the process proceeds to step S108 of the communication control processes according to the exemplary embodiments discussed above, and the processes in and after step S108 are executed. If the number of communication sessions in progress has not reached the number of concurrent sessions, a call connection is permitted. Therefore, the process proceeds to step S116 of the communication control processes according to the exemplary embodiments discussed above, and the processes in and after step S116 are executed.

In case of the speed priority mode, the process proceeds to step S101A_4. In the sixth exemplary embodiment, in case of the speed priority mode for the IP recognition mode, new communication in the IP recognition mode is not permitted until the band being used becomes 0 bps (or approximately 0 bps) even if there is an extra band. Therefore, in step S101A_4, the band being used is acquired from the band/number management region 30D. Then, in the next step S101A_5, it is determined whether or not the band being used is 0 bps. If the band being used is not 0 bps, a call connection is not permitted. Therefore, the process proceeds to step S108 of the communication control processes according to the exemplary embodiments discussed above, and the processes in and after step S108 are executed. If the band being used is 0 bps, on the other hand, a call connection is permitted. Therefore, the process proceeds to step S116 of the communication control processes according to the exemplary embodiments discussed above, and the processes in and after step S116 are executed.

In the sixth exemplary embodiment, as described above, switching may be made among the speed priority mode for the IP recognition mode, the number-of-sessions priority mode for the NGN mode and the via-GW mode, and the standard mode (corresponding to the fifth exemplary embodiment).

Seventh Exemplary Embodiment

A seventh exemplary embodiment includes a configuration and an operation generally similar to those of the exemplary embodiments discussed above. Therefore, such similarities will not be described in detail herein.

In the exemplary embodiments discussed above, the band in communication is managed as the band being used by the band management region 30B or the band/number management region 30D. In the case where image processing is performed by the image reading section 20, the image forming section 22, the image processing section 24, and so forth of the image processing apparatus 10, however, the image processing may affect the overall use band. In such a case, the band actually used for communication is obtained by subtracting a value obtained by converting the image processing into a band from the overall use band. Thus, the image processing apparatus 10 according to the seventh exemplary embodiment converts the degree of the effect of image processing on the communication band into a band, and adds the resulting band to the band being used.

Figure 9:
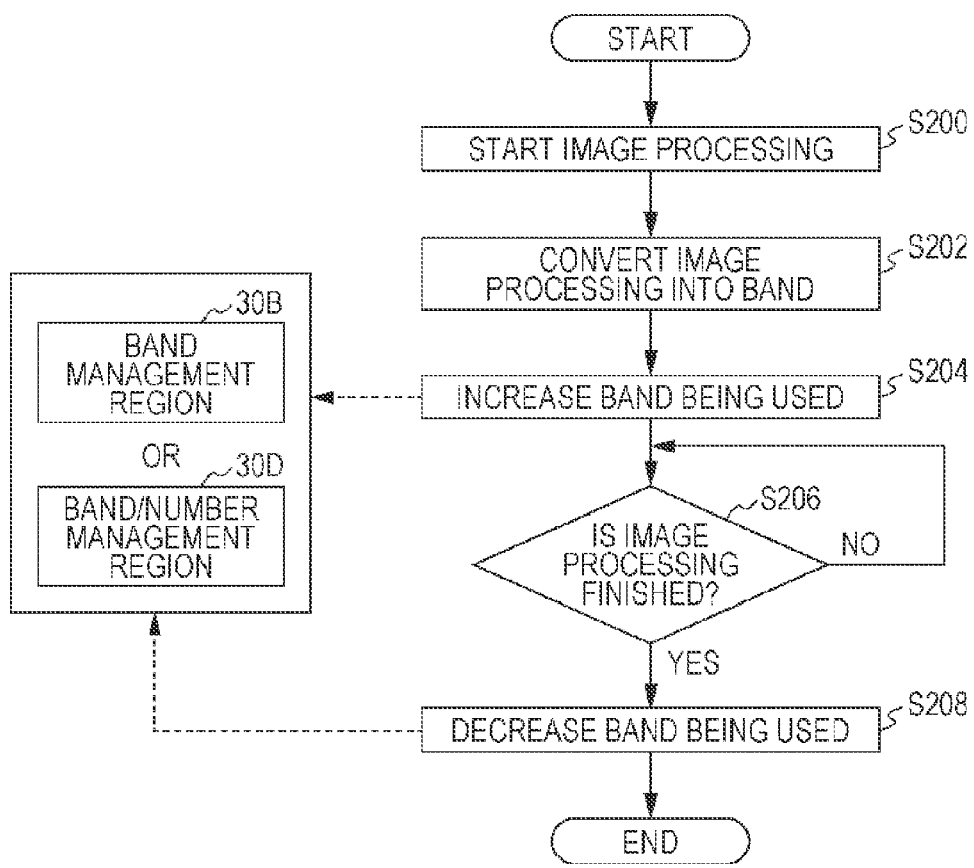
FIG. 9 is a flowchart of an example of an image processing band management process according to a seventh exemplary embodiment.

Therefore, the image processing apparatus 10 according to the seventh exemplary embodiment executes an image processing band management process along with execution of image processing. FIG. 9 is a flowchart of an example of the image processing band management process.

In step S200, image processing is started by the image reading section 20, the image forming section 22, the image processing section 24, and so forth. In the next step S202, the image processing is converted into a band. The image processing may be converted into a band using a calculation formula determined in advance or on the basis of a table stored in advance and indicating the correspondence between the type of image processing and the band. In a specific example, an optical character recognition (OCR) process in image reading may be converted into 1 Mbps, and a process of forming an image on a single storage medium from plural pages in image formation (copy) may be converted into 512 Kbps.

In the next step S204, the resulting band is added to the band being used of the band management region 30B or the band/number management region 30D. The determination result in the next step S206 is negative, and the image processing apparatus 10 stands by until the image processing is finished. The determination result becomes positive when the image processing is finished, and the process proceeds to step S208. After the resulting band is subtracted from the band being used, the process is finished.

In the seventh exemplary embodiment, as described above, in the case where the image processing apparatus 10 executes image processing, the image processing is converted into a band, and the resulting band is added to the band being used. Thus, the effect of image processing on the overall use band may be eliminated.

The present invention is not limited to application to the image processing apparatus 10 described above in relation to the exemplary embodiments, and may be applied to a facsimile (FAX, or image information communication device) provided with only a facsimile function. Image processing functions provided to the image processing apparatus 10 other than the FAX function are not specifically limited.

It is to be understood that the exemplary embodiments are illustrative of the present invention and may be modified in accordance with the situation without departing from the scope and spirit of the present invention. It is also to be understood that the configuration of the image processing apparatus 10, the SIP call connection controller 38, the IP FAX transfer controller 40, and the network controller 42, the communication control process, and so forth described in the embodiments are illustrative and may be modified in accordance with the situation without departing from the scope and spirit of the present invention.

What is claimed is:

1. An image processing apparatus comprising:
an image processing unit configured to perform predetermined image processing;
a communication unit configured to communicate image information with an external device in response to receiving a communication request;
a permission unit configured to permit the communication request on the basis of a result of comparison between a total band and an overall band, the total band being obtained by adding a communication band necessary for requested communication in the case where the communication unit receives the communication request and a band being used for other communications, and the overall band being obtained by converting an image processing capability of the apparatus into a band; and
a controller configured to control the communication unit so as to communicate with the external device for the request permitted by the permission unit,
wherein the permission unit is configured to acquire the communication band on the basis of a protocol matching a communication network requested by the communication request,
wherein the permission unit is configured to compare a value obtained by subtracting a converted value from the overall band and the total band, the converted value being obtained by converting image processing being executed by the image processing unit into a band,
wherein the image processing apparatus is configured for facsimile communication.

2. The image processing apparatus according to claim 1, wherein in the case where the communication request is a request for an incoming call from the external device to the apparatus,
the permission unit is configured to reject the incoming call request and the controller is configured to transmit a signal that indicates that the apparatus is busy to the external device for the request rejected by the permission unit in the case where the total band is more than the overall band, and the permission unit is configured to permit the incoming call request in the case where the total band is equal to or less than the overall band.

3. The image processing apparatus according to claim 1, wherein in the case where the communication request is a request for an outgoing call from the apparatus to the external device, the permission unit is configured to reject the outgoing call request and stand by to transmit an outgoing call in response to predetermined conditions in the case where the total band is more than the overall band, and permit the outgoing call request in the case where the total band is equal to or less than the overall band.

4. The image processing apparatus according to claim 1, wherein the permission unit is configured to acquire a band requested in a session description protocol as the communication band in the case where the communication request requests communication by way of a next generation network.

5. The image processing apparatus according to claim 4, wherein the controller is configured to allow communication with the external device at a band acquired as the communication band and the sum of which and the band being used is equal to or less than the overall band in the case where a total band obtained by adding the communication band acquired by the permission unit and the band being used is more than the overall band.

6. The image processing apparatus according to claim 1, wherein the permission unit is configured to acquire the communication band with reference to a transfer control protocol in the case where the communication request requests communication by way of a gateway.

7. The image processing apparatus according to claim 1, wherein the permission unit is configured to acquire a band corresponding to a maximum speed of the apparatus for communication performed in response to the communication request as the communication band.

8. The image processing apparatus according to claim 1, wherein the permission unit is configured to reject the communication request in the case where a number of communication sessions in progress performed by the communication unit is equal to or more than a predetermined number of sessions.

9. The image processing apparatus according to claim 8, wherein the predetermined number of sessions is switched in accordance with a type of a communication network.

10. The image processing apparatus according to claim 8, wherein the permission unit includes a setting unit configured to set which of the number of sessions and a communication speed is to be prioritized in accordance with a communication network requested by the communication request.

11. A non-transitory computer readable medium storing a communication control program causing a computer to function as the permission unit and the controller according to claim 1.

* * * * *